United States Patent [19]

Abele

[11] Patent Number: 4,691,928
[45] Date of Patent: Sep. 8, 1987

[54] ANTI-VIBRATIONAL ELECTRICAL-CONDUCTIVITY-CONFORMED SEAL ARRANGEMENT

[75] Inventor: Berthold W. Abele, Walheilm, Fed. Rep. of Germany

[73] Assignee: KSA Dichtsysteme GmbH, Vaihingen, Fed. Rep. of Germany

[21] Appl. No.: 774,655

[22] Filed: Sep. 11, 1985

[30] Foreign Application Priority Data

Sep. 12, 1984 [DE] Fed. Rep. of Germany ....... 3433376

[51] Int. Cl.[4] .............................................. F16J 15/10
[52] U.S. Cl. ................................ 277/235 B; 277/180; 277/228; 277/901
[58] Field of Search ........... 277/180, 227, 228, 235 R, 277/901

[56] References Cited

U.S. PATENT DOCUMENTS

| | | | |
|---|---|---|---|
| 2,513,178 | 6/1950 | Jackson | 277/180 |
| 2,795,444 | 6/1957 | Nenzell | 277/180 |
| 3,170,701 | 2/1965 | Hoover | 277/180 |
| 3,195,906 | 7/1965 | Moyers | 277/180 |
| 3,578,346 | 5/1971 | Jelinek | 277/180 |
| 3,664,676 | 5/1972 | Petersen | 277/235 B |
| 3,726,178 | 4/1973 | Dimitry | 277/180 |
| 3,986,721 | 10/1976 | Decker | 277/227 |
| 4,026,565 | 5/1977 | Jelinek | 277/235 B |
| 4,272,109 | 6/1981 | Ahlstone | 277/180 |
| 4,431,197 | 2/1984 | Kirkwood | 277/227 |

FOREIGN PATENT DOCUMENTS 919143 2/1963 United Kingdom ............... 277/180

*Primary Examiner*—Robert S. Ward
*Attorney, Agent, or Firm*—Becker & Becker, Inc.

[57] ABSTRACT

A seal, especially a flat, gasket-type seal for placement between two structural machine parts. The seal has an elastomeric sealing member which is associated with a carrier member. The structural parts which are to be sealed off are adapted to be pressed against surfaces of the carrier member. The carrier member is made of a resistant synthetic material which is resistant to compression. To provide a one-piece component, the elastomeric sealing member is securely vulcanized to the carrier member. The vulcanized connection includes a peripheral surface which extends transversely between sealing portions of the elastomeric member, and a side surface of synthetic material which is disposed transversely between synthetic material abutment surfaces of the carrier member.

16 Claims, 3 Drawing Figures

ANTI-VIBRATIONAL ELECTRICAL-CONDUCTIVITY-CONFORMED SEAL ARRANGEMENT

BACKGROUND OF THE INVENTION

1. Field of the Invention

The present invention relates to a seal, especially a flat, gasket-type seal for placement between two structural machine parts, having an elastomeric sealing member provided with sealing portions, and an associated carrier member, with the structural parts which are to be sealed off being adapted to be pressed against surfaces of the carrier member.

2. Description of the Prior Art

Known seals having a carrier and an elastic sealing member are generally embodied as flat, gasket-type seals, and are frequently used for sealing the housings or the like in the engine construction industry and in the general machine industry. The structural parts which are to be connected to one another are thus supposed to be sealed to prevent the escape of, for example, a gaseous or liquid medium. Since such seals are exposed, amoung other things, to chemical effects, steel alloys (stainless steel V2A or V4A) are used for the carrier of the seal. Such steel alloys require special chemical and-/or mechanical, i.e. heat technique, treatment, which is relatively expensive and complicated, in order to achieve a satisfactory use of the carrier material with the material of the sealing member.

The heretofore known seals having metal carriers have the further drawback that when used with machine elements where oscillations or vibrations occur, these known seals can amplify noise in that additional drone-like effects occur at certain resonances. Thus, metal carriers provide no damping effect; rather, at certain resonances, they even amplify vibrations. Another drawback with heretofore known seals is that due to the high electrical conductivity of the metal carriers, the possible applications of such seals is limited, since it is not possible to use these known seals where an electrically nonconducting seal is required, or where an insulator having a low electrical conductivity is required.

An object of the present invention is to improve a seal of the aforementioned general type in such a way that the aforementioned drawbacks are avoided and an economical, mass-producible article is achieved with simple means. Furthermore, it is an object of the present invention to eliminate expensive and complicated preliminary and subsequent processing for the interconnection of the carrier and the elastic sealing member.

BRIEF DESCRIPTION OF THE DRAWING

These objects, and other objects and advantages of the present invention, will appear more clearly from the following specification in conjunction with the schematic drawing, in which.

SUMMARY OF THE INVENTION

Figure 1:
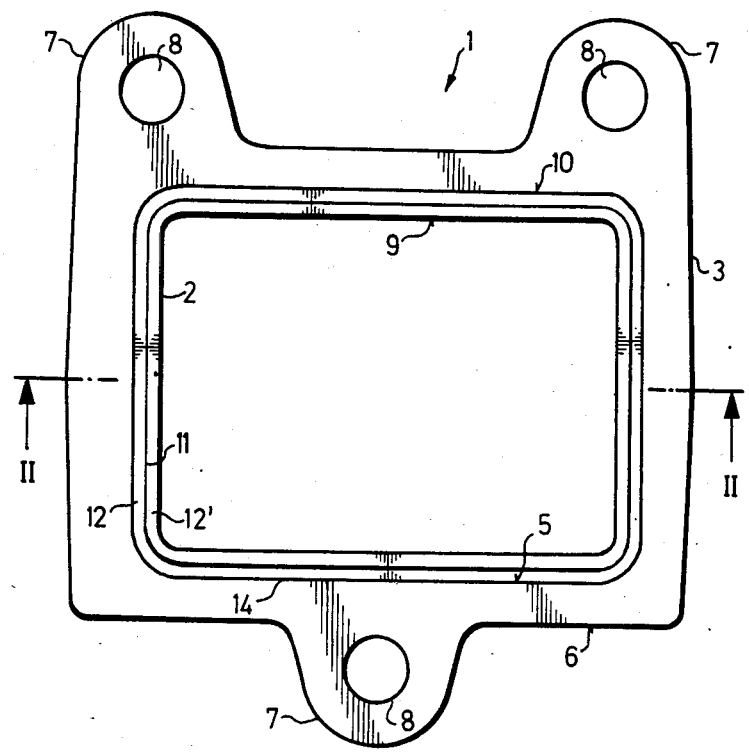
FIG. 1 is a plan view of one inventive embodiment of a seal.

The seal of the present invention is characterized primarily in that the elastomeric sealing member has a peripheral surface which is disposed between the sealing portions, which are provided on opposite sides of the sealing member; in that the carrier member is resistant to compression and is made of a resistant synthetic material, with the surfaces of the carrier member against which the structural parts are to be pressed being in the form of abutment surfaces of said synthetic material, with a side surface of said synthetic material being disposed transversely between these abutment surfaces; and in that the peripheral surface of the sealing member is vulcanized to the side surface of the carrier member.

Preferred embodiments and further features, as well as other advantages of the present invention, will be described subsequently.

DESCRIPTION OF PREFERRED EMBODIMENTS

Referring now to the drawing in detail, the illustrated inventive seal 1 is embodied as a flat gasket-type seal, and has an inner elastomeric sealing portion 2 which is surrounded by a carrier portion 3 of synthetic material. The elastomeric sealing portion 2 is absolutely securely connected by vulcanization with the carrier portion 3, so that a reliable material-connection is assured even when high stresses are encountered during assembly and in the installed state. The elastomeric sealing portion 2 preferably comprises a rubber-like material, and has a hardness of about 40 to 90 Shore A.

Figure 2:
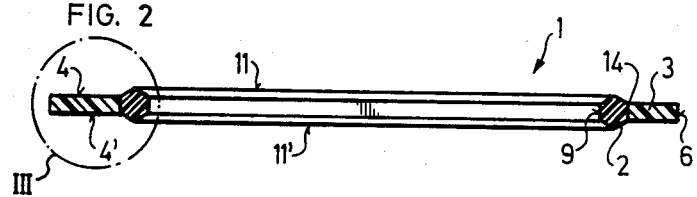
FIG. 2 is a sectioned side view of the seal taken along the line II—II in FIG. 1.
Figure 3:
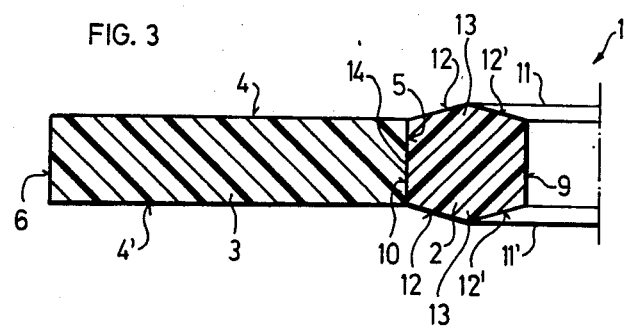
FIG. 3 is an enlarged sectional view of the portion encircled by the dot-dash line III in FIG. 2.

In the illustrated exemplary embodiment, the carrier portion 3 of synthetic material which surrounds the elastomeric sealing portion 2 has a flat, rectangular cross-section with two faces in the form of abutment surfaces 4, 4' of synthetic material (FIGS. 2 and 3) against which the structural parts which are to be interconnected can be pressed. The cross-sectional width of the carrier portion 3 in the plane of the abutment surfaces 4, 4' is considerably greater than the thickness in the axial direction between said abutment surfaces 4, 4'. The thickness of the carrier portion 3 of synthetic material, i.e. the length of the inner side surface 5 of synthetic material, and the length of the outer side surface 6, is thus considerably shorter, preferably approximately four times shorter, than the width of the carrier portion 3. The carrier portion 3 is also provided with ear-like projections 7, each of which has a through bore 8. Threaded bolts, fluid lines, or the like can extend through these through bores 8.

The synthetic material for the carrier portion 3 can be a chemically resistant thermoplastic material which to a large extent can withstand high temperatures, with preferred materials being polyamide 6 or polyamide 66. Furthermore, it is advantageous within the scope of the present invention to have the synthetic material of the carrier portion 3 be a duroplastic, i.e. thermosetting, material, especially polyester resin, epoxide resin, or phenolic resin. It can also be expedient to reinforce the thermoplastic or thermosetting material of the carrier portion 3 with a filler. This filler additive can comprise approximately 10 to 70%. Inorganic fillers are preferred, especially quartz sand, finely ground quartz, fiberglass, ground glass, or alumina trihydrate. As a result of the filler, it is possible in particular to achieve an increase of the resistance to compression, and of the resistance to high temperatures over a prolonged period of time.

In the illustrated embodiment, the elastomeric sealing portion 2 has a hexagonal cross-section, with the sides thereof being approximately the same length. In the axial direction, the length of the inner wall 9 and of the outer peripheral surface 10 of the elastomeric sealing portion 2 is the same as the length of the inner side surface 5 as well as the outer side surface 6 of the carrier portion 3. The width of the sealing portion 2 between the inner wall 9 and the peripheral surface 10 corresponds approximately to the thickness of the sealing portion 2 in the axial direction between two opposite sealing lips 11, 11' on opposite faces of the sealing portion 2, with this width being considerably less than the width of the carrier portion 3. However, it can also be expedient to have the width of the carrier portion 3 and the width of the elastomeric sealing portion 2 be essentially the same.

The sealing lips 11, 11' are formed from the angular regions of two abutting inclined surfaces 12, 12', which form the triangular sealing portions 13, 13' of the elastomeric sealing portion 2. When viewed in the axial direction, the two sealing portions 13, 13' extend beyond the respective abutment surfaces 4, 4' of the carrier portion 3 of synthetic material.

In the illustrated inventive seal 1, the vulcanized connection 14 is provided at the peripheral surface 10 of the sealing portion 2 and the inner side surface 5 of the carrier portion 3. The length of the vulcanized connection 14 in the axial direction extends over the entire thickness of the carrier portion 3. So that the vulcanized connection 14 of the two parts which form the seal 1 has a decidedly high strength, it can be expedient to mechanically roughen or chemically dissolve a portion of the inner side surface 5 of the carrier portion 3 and/or of the outer peripheral surface 10 of the sealing portion 2.

An important advantage of the inventive seal 1 is that no preliminary or subsequent processing of the end faces and of the outer side surfaces of the carrier portion 3 is required, and the use of high-grade and expensive stainless steel alloys for the carrier plates can be avoided, so that on the whole a more economical production of the mass-producible seal 1 is possible. A further advantage of the present invention is that an anti-vibrational effect is achieved due to the damping property of the inventive carrier portion 3 of synthetic material, and no vibrations are amplified nor can drone-like noises occur. Furthermore, the inventive seal 1 can also be advantageously used where an electrical insulator is required between the two structural parts which are to be interconnected. In this connection, it can also be expedient to add, for example, copper, aluminum, or silver dust to the material of the carrier portion 3, so that the electrical conductivity of the latter is increased. By means of a precise dosing and satisfactory mixing of the conductive additives, the thus achieved electrical conductivity of the carrier portion 3 can be precisely conformed to the respective requirements, and can be maintained in a selective manner.

The present invention is, of course, in no way restricted to the specific disclosure of the specification and drawing, but also encompasses any modifications within the scope of the appended claims.

What I claim is:

1. A seal having an elastomeric sealing part provided with sealing portions, and an associated carrier part, with structural parts which are to be sealed off being adapted to be pressed against surfaces of said carrier part; the improvement wherein said sealing part has a coaxially extending peripheral surface disposd between said sealing portions, which are provided on opposite sides of said sealing part having two sealing lips provided on opposite sides of said sealing part as well as including two surfaces cutting into each other in a sealing edge and extending from said peripheral surface as well as from inner periphery of said sealing part; wherein said carrier part consists of synthetic material resistant to compression; wherein said surfaces of said carrier part against which said structural parts are to be pressed are in the form of two parallel abutment surfaces of said synthetic material, with a side surface of said synthetic material being disposed transversely between said abutment surfaces, said sealing lips projecting over said abutment surfaces; and wherein said peripheral coaxially extending surface of said sealing part is vulcanized to said side surface of said carrier part, said peripheral coaxially extending surface of said sealing part being axially equal in length to said side surface of said carrier part.

2. A seal according to claim 1, in which said elastomeric sealing part comprises a rubber-like material having a hardness of about 40 to 90 Shore A.

3. A seal according to claim 2, in which said synthetic material of said carrier part is reinforced with a filler.

4. A seal according to claim 3, in which said filler is an inorganic material selected from the group consisting of quartz sand, Fiberglass, and alumina trihydrate.

5. A seal according to claim 2, in which said synthetic material of said carrier part is a thermoplastic material which is resistant to high temperatures.

6. A seal according to claim 5, in which said thermoplastic material is a polyamide resin.

7. A seal according to claim 2, in which said synthetic material of said carrier part is a thermosetting material.

8. A seal according to claim 7, in which said thermosetting material is selected from the group consisting of polyesters, epoxies, and phenolic resins.

9. A seal according to claim 2, in which said vulcanized connection between said carrier part and said elastomeric sealing part is effected at least in part by a mechanical or chemical preparation of at least one of said peripheral surface of said sealing part and said side surface of said carrier part.

10. A seal according to claim 1, in which said carrier part extends around said elastomeric sealing part; in which said side surface of said
   carrier part is an inwardly facing side surface; in which said peripheral surface of said sealing part is an outwardly facing peripheral surface; and in which said vulcanized connection is formed between said inwardly facing side surface and said outwardly facing peripheral surface.

11. A seal according to claim 10, in which said sealing portions of said sealing part extend beyond said abutment surfaces of said carrier part.

12. A seal according to claim 11, in which each of said sealing portions of said sealing part has an approximately triangular configuration formed by two inclined surfaces which adjoin one another to at that location form a sealing lip.

13. A seal according to claim 12, in which said carrier part also has an outwardly facing side surface, and said sealing part also has an inwardly facing wall; and in which the width of said carrier part, as measured between its inwardly facing side surface and its outwardly facing side surface, is at least as great as the width of said sealing part, as measured between its outwardly facing peripheral surface and its inwardly facing wall.

14. A seal according to claim 13, in which the length of said inwardly facing wall and said outwardly facing peripheral surface of said sealing part, and the length of said vulcanized connection, measured in the axial direction, is essentially the same as the thickness of said carrier part as measured between its abutment surfaces.

15. A seal according to claim 14, in which said sealing part has a hexagonal cross-section, the sides of which have approximately the same length; and in which said carrier part has a flat, rectangular cross-section.

16. A seal according to claim 15, in which said carrier part is provided with through bores which extend in the axial direction.

* * * * *